US008843307B1

(12) United States Patent
Kolodziej

(10) Patent No.: US 8,843,307 B1
(45) Date of Patent: Sep. 23, 2014

(54) REAL TIME PARKING LOCATION NAVIGATOR

(75) Inventor: Kris Kolodziej, Asbury, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 364 days.

(21) Appl. No.: 13/154,970

(22) Filed: Jun. 7, 2011

(51) Int. Cl.
*G01C 21/34* (2006.01)
*B60Q 1/48* (2006.01)

(52) U.S. Cl.
USPC ........................................ 701/410; 340/932.2

(58) Field of Classification Search
USPC ......... 701/207, 209, 210, 410–414, 416, 423, 701/425, 430; 340/932.2
See application file for complete search history.

(56) References Cited

U.S. PATENT DOCUMENTS

| | | | |
|---|---|---|---|
| 5,910,782 A * | 6/1999 | Schmitt et al. ........... 340/995.12 |
| 5,991,689 A | 11/1999 | Aito et al. | |
| 6,147,624 A | 11/2000 | Clapper | |
| 6,650,999 B1 | 11/2003 | Brust et al. | |
| 7,200,387 B1 | 4/2007 | Ephraim et al. | |
| 7,834,778 B2 | 11/2010 | Browne et al. | |
| 2001/0041960 A1 | 11/2001 | Hashida | |
| 2002/0049533 A1 | 4/2002 | Kusano et al. | |
| 2002/0098855 A1 | 7/2002 | Hartmaier et al. | |
| 2006/0111835 A1 | 5/2006 | Baker et al. | |
| 2008/0167806 A1 | 7/2008 | Wheeler et al. | |
| 2008/0222004 A1 | 9/2008 | Pollock et al. | |
| 2009/0197617 A1 | 8/2009 | Jayanthi | |
| 2009/0198443 A1 * | 8/2009 | Yamazaki ....................... 701/210 |
| 2009/0234741 A1 | 9/2009 | Saitoh et al. | |
| 2009/0240575 A1 * | 9/2009 | Bettez et al. ..................... 705/13 |
| 2009/0313109 A1 | 12/2009 | Bous et al. | |
| 2010/0004959 A1 | 1/2010 | Weingrad | |
| 2010/0052946 A1 * | 3/2010 | Levine et al. ............... 340/932.2 |
| 2010/0093333 A1 | 4/2010 | Friedenthal et al. | |
| 2010/0125497 A1 | 5/2010 | Arguello | |
| 2010/0156933 A1 | 6/2010 | Jones et al. | |
| 2010/0190510 A1 | 7/2010 | Maranhas et al. | |
| 2010/0268592 A1 | 10/2010 | Shaer | |
| 2011/0224899 A1 * | 9/2011 | Mathews ....................... 701/201 |
| 2011/0238301 A1 * | 9/2011 | Lee ................................ 701/207 |
| 2012/0002989 A1 | 1/2012 | Sakata et al. | |
| 2012/0003989 A1 | 1/2012 | Gravino | |
| 2012/0089470 A1 | 4/2012 | Barnes | |
| 2012/0203600 A1 * | 8/2012 | Fiorucci et al. .................. 705/13 |
| 2012/0265434 A1 * | 10/2012 | Woodard et al. .............. 701/423 |

FOREIGN PATENT DOCUMENTS

| | | |
|---|---|---|
| EP | 2080984 | 7/2009 |
| EP | 2104018 | 9/2009 |
| JP | 7-229752 | 8/1995 |

(Continued)

OTHER PUBLICATIONS

"Non-Final Office Action", Non-Final Office Action dated Feb. 28, 2012.

(Continued)

*Primary Examiner* — Mary Cheung
*Assistant Examiner* — Rodney Butler

(57) ABSTRACT

A real time parking location navigator may automatically locate an available parking location and provide navigation information indicative of how to navigate to this location. Payment for the available parking location may also be automatically made. Either or both of these may be done at the time the vehicle is in proximity to a programmed destination.

24 Claims, 5 Drawing Sheets

(56) References Cited

FOREIGN PATENT DOCUMENTS

| | | |
|---|---|---|
| JP | 10-170301 | 6/1998 |
| JP | 2001-074491 | 3/2001 |
| JP | 2008-122340 | 5/2008 |

OTHER PUBLICATIONS

"Non-Final Office Action", Non-Final Office Action dated Mar. 29, 2012.

"Response to Non-Final Office Action", Response to Non-Final Office Action of Feb. 28, 2012, filed May 1, 2012.

Grunberg, "Yowzall Version 2.0 with Advanced Features and More Retail Partners", Popular Mobile Couponing App. Yowzall Co-Created by Heroes' Star, Greg Grunberg, Launches, Yowzall Version 2.0 with Advanced Features and More Retail Partners; https://getyowza.com/pr/releases/2009/09/1; 2009-2010.

Google Mobile Blog: Check in with Google Latitude. Weblog dated Feb. 1, 2011. (Downloaded from http://googlemobile.blogspot.com/2011/02/check-in-with-google-latitude.html).

Droid Life: A Droid Community Blog—All about Android and the Droid lineup of phones, Rooting, Apps, Review, and Videos. Google Maps 5.1.0 Update Available, Allows for Auto Check-in and Friend Notification (Updated). Dated Feb. 1, 2011, in Apps, News, by Kellex. (Downloaded from http://www.droid-life.com/2011/02/01/google-maps-5-1-0-update-available.).

Google Mobile: Mobile: Check-ins, Check-ins Overview. 2011. (Downloaded from http://www.google.com/support/mobile/bin/answer.py?answer-1138301.).

U.S. Appl. No. 12/870,412, filed Aug. 27, 2010, entitled "Detected Arrival at Navigated Destination Automatically Triggers Delivery of Relevant Local Information to User,".

U.S. Appl. No. 12/870,389, filed Aug. 27, 2010, entitled "Detected Arrival at Navigated Destination Automatically Triggers Delivery of Arrival Notice to Third Party,".

U.S. Appl. No. 12/870,460, filed Aug. 27, 2010, entitled "Parking Space Location Automatically Recorded Following Detected Arrival at Navigated Destination."

\* cited by examiner

REAL TIME PARKING LOCATION NAVIGATOR

CROSS-REFERENCE TO RELATED APPLICATION

This application is related to U.S. patent application Ser. No. 12/870,460, entitled "PARKING SPACE LOCATION AUTOMATICALLY RECORDED FOLLOWING DETECTED ARRIVAL AT NAVIGATED DESTINATION," filed Aug. 27, 2010, the entire contents of which are incorporated herein by reference.

BACKGROUND

1. Technical Field

This disclosure relates to finding available parking locations, wireless mobile communication devices, and navigation information.

2. Description of Related Art

Finding an available parking location can be a time consuming and frustrating process.

Databases are being created to assist in this process. They provide real time information about available parking locations. However, it can be difficult and even dangerous for a vehicle driver to access such a database while driving a vehicle. Although the driver may access this information before a trip begins, the information may no longer be valid by the time the driver arrives at the destination. The driver may also access this database upon arrival at the destination, but this may result in excessive travel, as available parking may be at a different location.

SUMMARY

A real time parking location navigator may automatically locate an available parking location and provide navigation information indicative of how to navigate to this location. Payment for the available parking location may also be made automatically.

The real time parking location navigator may include a navigation system and a data processing system. The navigation system may provide navigation information indicative of how to navigate a vehicle to a programmed destination and to an available parking location that is near but different from the programmed destination. The data processing system may receive the programmed destination, cause the navigation system to provide the navigation information to the programmed destination, and determine when the vehicle is in proximity to the programmed destination. In response to determining that the vehicle is in the proximity to the programmed destination, the data processing system may query a parking location database for an available parking location that is near the programmed destination, receive the available parking location from the parking location database, and cause the navigation system to provide navigation information indicative of how to navigate to the available parking location.

The data processing system may offer a user-settable parking option governing whether the data processing system queries and provides the navigation information about an available parking location. A setting may be offered that makes the parking option selected by the user applicable to all programmed destinations. The parking option may be offered at or about the time when the destination is programmed, or offered when the vehicle is first detected to be in proximity to the programmed destination.

The data processing system may determine when the vehicle is in proximity to the destination based on an estimated arrival time, the remaining distance the vehicle must travel to reach the programmed destination, data in the parking location database indicative of how quickly parking spaces at the available parking location remain available, and/or by detecting that the vehicle has circled an area at slow speeds.

The available parking location may be the location of a parking lot or a specific parking space.

The data processing system may offer a purchase option to purchase a parking space at the available parking location. A setting may be officer that makes the purchase option setting applicable to all programmed destinations. The purchase option may be offered at the time the programmed destination is programmed, or at the time the vehicle is determined to be in close proximity to the programmed destination.

The data processing system may query the parking location database after receiving the available location from the parking location database to determine if the available parking location is still available. If the location is no longer available, the data processing system may re-query the parking location database for a different available parking location that is near the programmed destination and cause the navigation system to provide navigation information indicative of how to navigate to the different available parking location.

The data processing may receive information indicative of how long the vehicle will need the available parking space and select an available parking location that is indicated by information in the parking location database as being available for as long as the space will be needed by the vehicle.

The data processing system may receive information indicative of how long the available parking location will be available. After the vehicle has begun to use the available parking location but before it is no longer available, the data processing system may issue a warning to a user of the real time parking location navigator of the approaching unavailability of the available parking location. The warning may be issued without the user having to manually set a timer.

The data processing system may store the location at which the vehicle parked and, upon request, cause the navigation system to provide navigation information to a user about how to navigate to the parked vehicle.

Non-transitory, tangible, computer-readable media may contain a program of instructions that cause a computer system running the program to perform the steps that the real time parking location navigator performs, as described herein.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
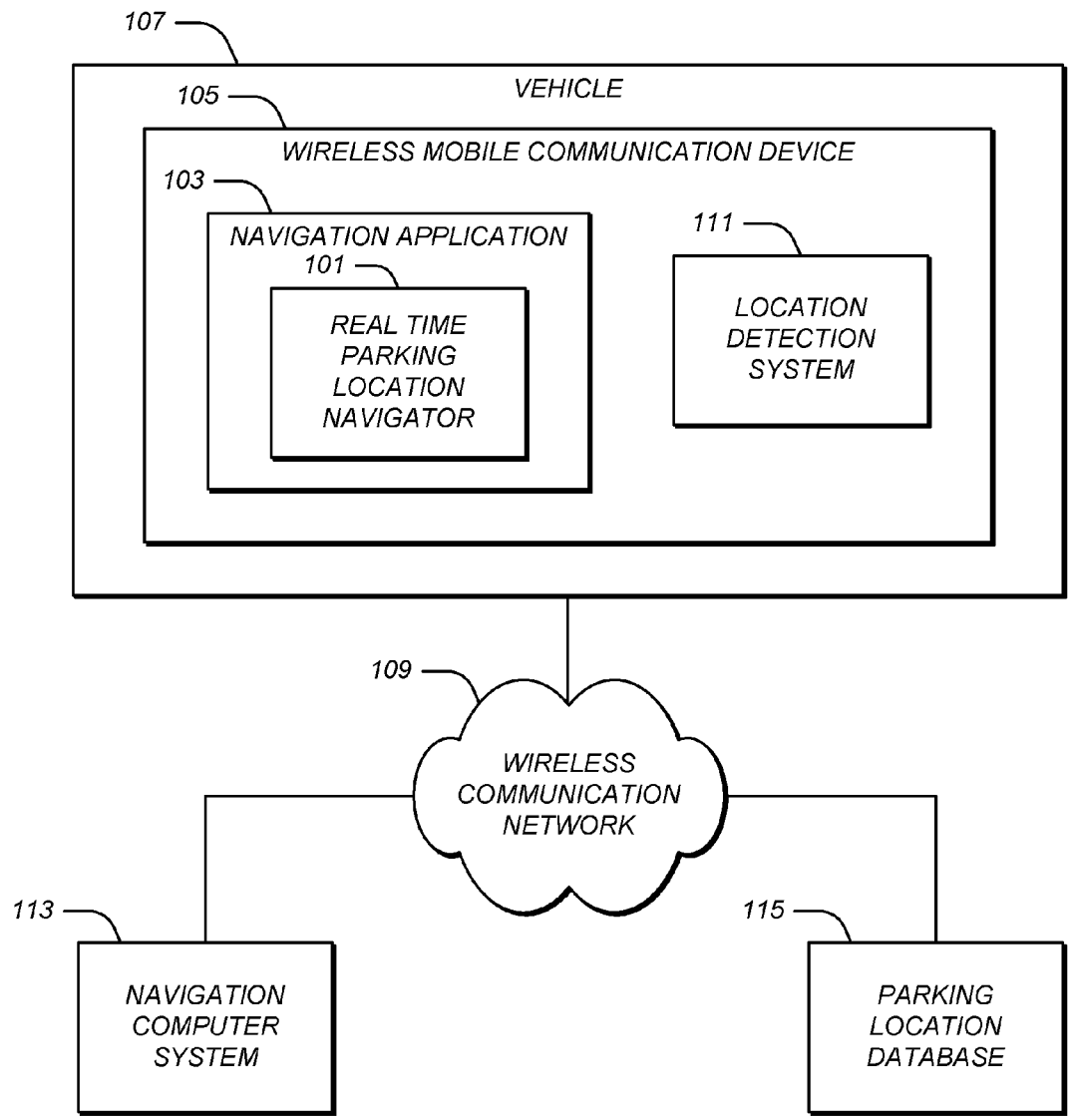
FIG. 1 illustrates a real time parking location navigator within a wireless mobile communication device, a vehicle containing the wireless mobile communication device, and related systems.

FIG. 1 illustrates a real time parking location navigator 101 within a wireless mobile communication device 105, a vehicle 107 containing the wireless mobile communication device, and related systems. As illustrated in FIG. 1, the real time parking location navigator 101 is part of a navigation application 103 within the wireless mobile communication device 105 that is located within the vehicle 107.

The vehicle 107 may be of any type. For example, the vehicle 107 may be an automobile, a truck, or a motorcycle.

The wireless mobile communication device 105 may be of any type. For example, the wireless mobile communication device 105 may be a mobile phone, a PDA, a laptop computer, or a tablet computer. The wireless mobile communication device 105 may be installed in the vehicle 107 or carried into it.

The wireless mobile communication device 105 is configured to communicate wirelessly over a wireless communication network 109. The wireless mobile communication device 105 includes a location detection system 111 that is configured to detect the geographic location of the wireless mobile communication device 105.

The location detection system 111 may be of any type. For example, the location detection system 111 may include a GPS receiver configured to detect location by analyzing GPS signals. The location detection system 111 may in addition or instead utilize the location of one or more cell sites that are in communication with the wireless mobile communication device 105. Any other type of location detecting technology may be used in addition or instead.

The navigation application 103 is configured to provide navigation information indicative of how to navigate to a programmed destination. To facilitate this, the navigation application 103 may communicate with a navigation computer system 113 using the wireless communication network 109. The navigation computer system 113 is configured to receive geographic coordinate information indicative of the current location of the wireless mobile communication device 105 and the street address of a desired destination. The navigation computer system 113 is configured to provide navigation instructions based on this information, using a map and other information. The navigation computer system 113 is configured to return these navigation instructions to the navigation application 103 for delivery to a user of the wireless mobile communication device 105. The delivery may be in the form of audio, graphics, and/or in any other form.

The navigation computer system 113 is configured to communicate with the navigation application 103 through the wireless communication network 109. The navigation computer system 113 may have an Internet address, in which case the wireless communication network 109 may include a gateway that facilitates communication between the navigation application 103 and the navigation computer system 113.

In an alternate configuration, the navigation application 103 may itself generate the navigation instructions based on the programmed destination and the geographic coordinate information. In this configuration, the navigation application 103 need not communicate with the navigation computer system 113.

The real time parking location navigator 101 is configured to provide information indicative of available parking locations that are near the programmed destination. The real time parking location navigator 101 may also be configured to provide navigation information to the available parking location and, optionally, to cause payment for the available parking location to be made prior to arrival. More details about the real time parking location navigator 101 are set forth below in connection with the discussion of FIGS. 3-6.

A parking location database 115 contains real time information about the availability of parking locations at various geographic locations. An example of such a database is Parking In Motion™. The parking location database 115 may have an Internet address, in which case the wireless communication network 109 may include a gateway that facilitates communication with the parking location database. More information about the parking location database 115 and information about its use by the navigation computer system 113 and the navigation application 103 is set forth below in connection with the description of FIGS. 3-6.

Figure 2:
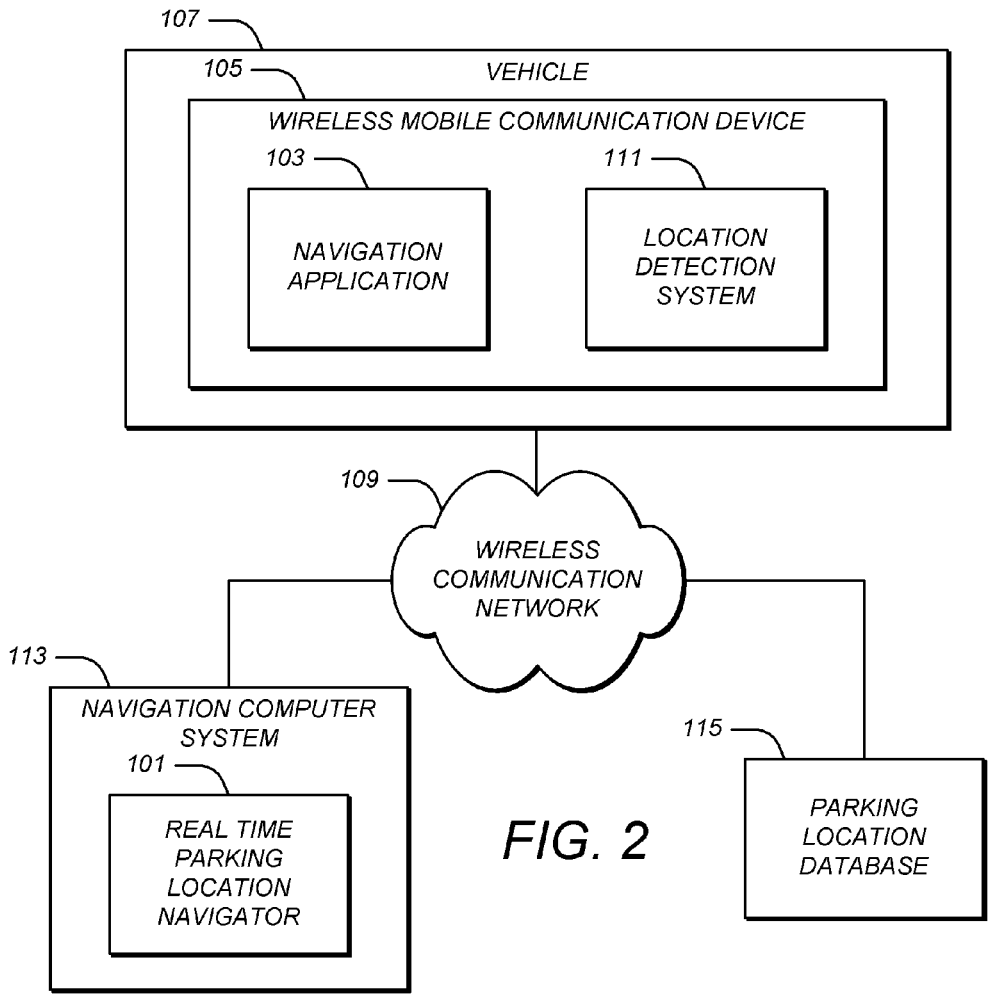
FIG. 2 illustrates an alternate configuration to what is illustrated in FIG. 1 in which the real time parking location navigator is within a navigation computer system that is not within the vehicle.

FIG. 2 illustrates an alternate configuration to what is illustrated in FIG. 1 in which the real time parking location navigator 101 is located within the navigation computer system 113 and thus not within the vehicle 107. FIG. 2 thus illustrates that the real time parking location navigator 101 may be at locations other than within the wireless mobile communication device 105. The real time parking location navigator 101 may in whole or in part be located elsewhere, such as within its own computer system that is separate from the navigation computer system 113 and the wireless mobile communication device 105.

When the real time parking location navigator 101 is located external to the wireless mobile communication device 105, the navigation application 103 is configured to communicate with the real time parking location navigator 101 to provide the real time parking location navigator 101 with information about the location of the wireless mobile communication device 105 from the location detection system 111, and to receive from the real time parking location navigator 101 information about available parking locations. Details of how this may work are presented below.

Figure 3:
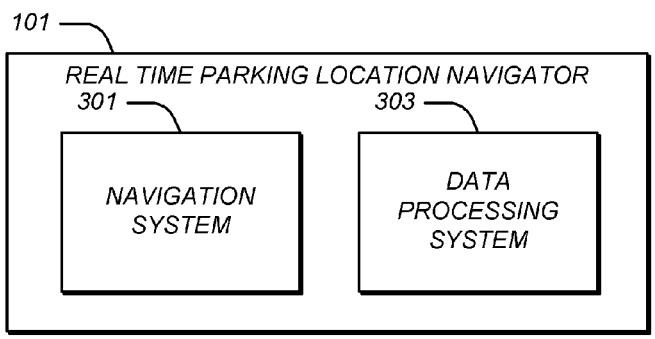
FIG. 3 illustrates an example of components within the real time parking location navigator illustrated in FIGS. 1 and 2.

FIG. 3 illustrates an example of components within the real time parking location navigator 101 illustrated in FIGS. 1 and 2. As illustrated in FIG. 3, the real time parking location navigator 101 includes a navigation system 301 and a data processing system 303. Functions which these systems are configured to perform are described below in connection with the discussion of FIGS. 4-6. The real time parking location navigator 101 may have additional components and/or not all of the components that are illustrated in FIG. 3.

The navigation system 301 is configured to provide navigation information indicative of how to navigate a vehicle to a programmed destination and how to navigate the vehicle to an available parking location that is near, but different from, the programmed destination. To accomplish this, the navigation system 301 is configured to receive information indicative of the location of the programmed destination and of an available parking location. This information may be in the form of street addresses, in which case the navigation system 301 may communicate with the navigation computer system 113 to translate these street addresses into geographic coordinates.

The data processing system 303 is configured to perform a variety of functions. These are now discussed in connection with the discussion of FIGS. 4-6.

Figure 4:
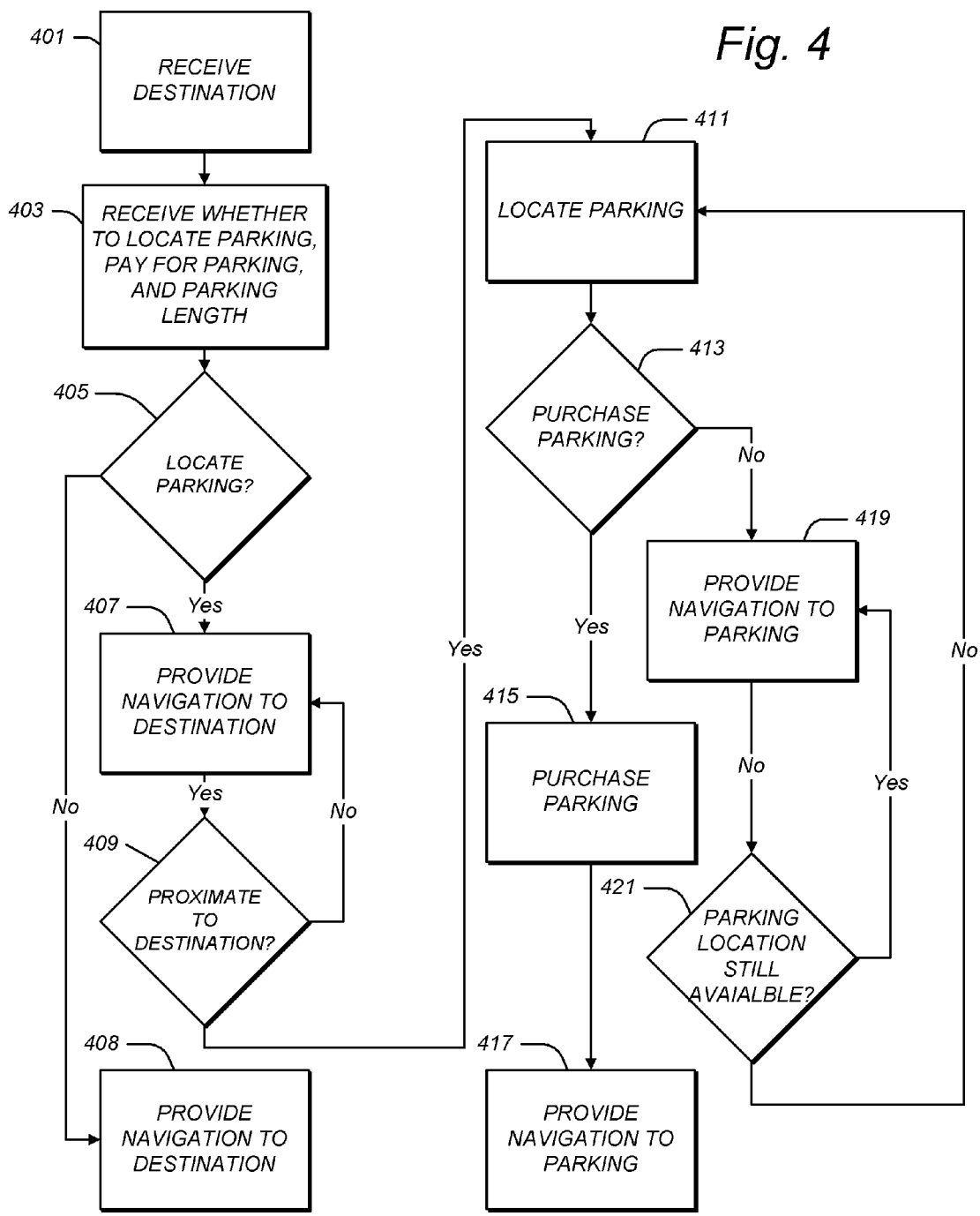
FIG. 4 illustrates a process for providing real time navigation to a destination and to a parking location, as well as related services, that the real time parking location navigator illustrated in FIGS. 1-3 can implement.

FIG. 4 illustrates a process for providing real time navigation to a destination and to a parking location, as well as related services, that the real time parking location navigator 101 illustrated in FIGS. 1-3 can implement. As reflected by a Receive Destination step 401, the data processing system 303 is configured to receive a desired destination. This may be in the form of a street address, in which case it may be translated into geographic coordinates, such as through communication with the navigation computer system 113.

The data processing system 303 may be configured to receive information about whether the user wishes for the real time parking location navigator 101 to locate an available parking location that is near the programmed destination, whether the user wishes for the real time parking location navigator 101 to automatically pay for that parking location, and the length of time during which the parking location is needed. This is reflected by a Receive Whether to Locate Parking, Pay for Parking, and Parking Length step 403.

Figure 5:
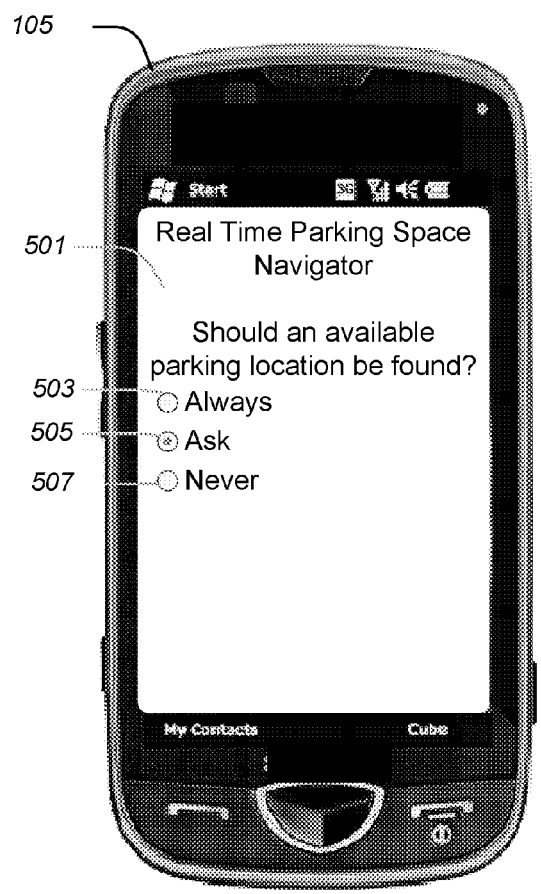
FIG. 5 illustrates a dialog box that presents configuration options that a user may select relating to whether the real time parking location navigator locates an available parking location.
Figure 6:
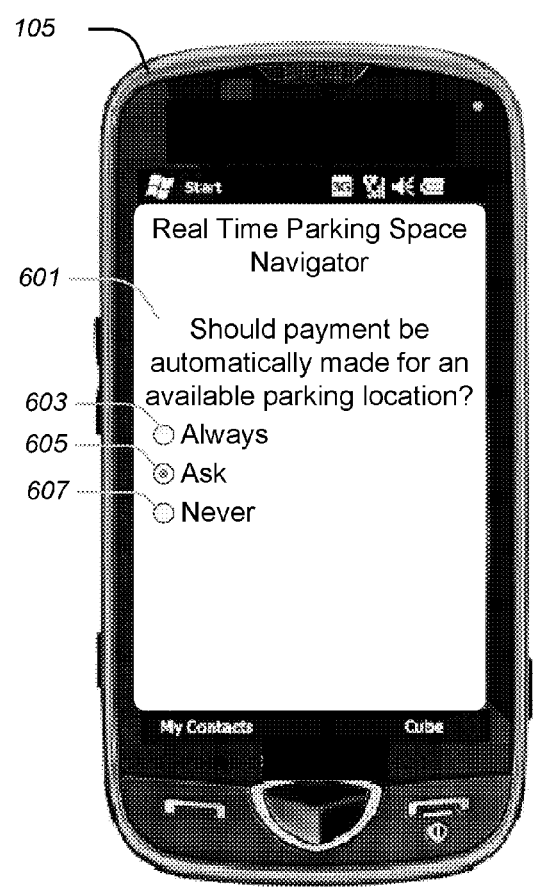
FIG. 6 illustrates a dialog box that presents configuration options that a user may select relating to whether the real time parking location navigator pays for an available parking location.

FIG. 5 illustrates a dialog box 501 that presents configuration options that a user may select to specify whether the real time parking location navigator 101 should locate an available parking location. As illustrated in FIG. 6, the user may select an Always option 503, an Ask option 505, or a Never option 507. The user may also or instead specify these options verbally. If the user selects the Always option 503, the real time parking location navigator 101 will always locate an available parking location. If the user selects the Never option 507, the real time parking location navigator 101 will never locate an available parking location. If the user selects the Ask option 505, the real time parking location navigator 101 will ask the user whether to locate an available parking location.

Other types of options may be specified in addition or instead. For example, the options may offer a user the opportunity to specify that the parking location navigator 101 should only locate an available parking location in a specified city, one or more specific geographical areas within a particular city (e.g., over a range of several blocks or along a predetermined street near a specified location), and/or during specified times. The user may also or instead specify options verbally.

FIG. 6 illustrates a dialog box 601 that presents configuration options that a user may select to specify whether the real time parking location navigator should pay for an available parking location. The user may also or instead specify these options verbally. As illustrated in FIG. 6, the user may select an Always option 603, an Ask option 605, or a Never option 607. If the user selects the Always option 603, the real time parking location navigator 101 will always pay for an available parking location, when possible. If the user selects the Never option 607, the real time parking location navigator 101 will never pay for an available parking location. If the user selects the Ask option 605, the real time parking location navigator 101 will ask the user whether to pay for an available parking location.

Again, other types of options may be specified in addition or instead. For example, the options may offer a user the opportunity to specify that the parking location navigator 101 should only pay for an available parking location in a specified city, geographical area in a particular city and/or during specified times.

Figure 7:
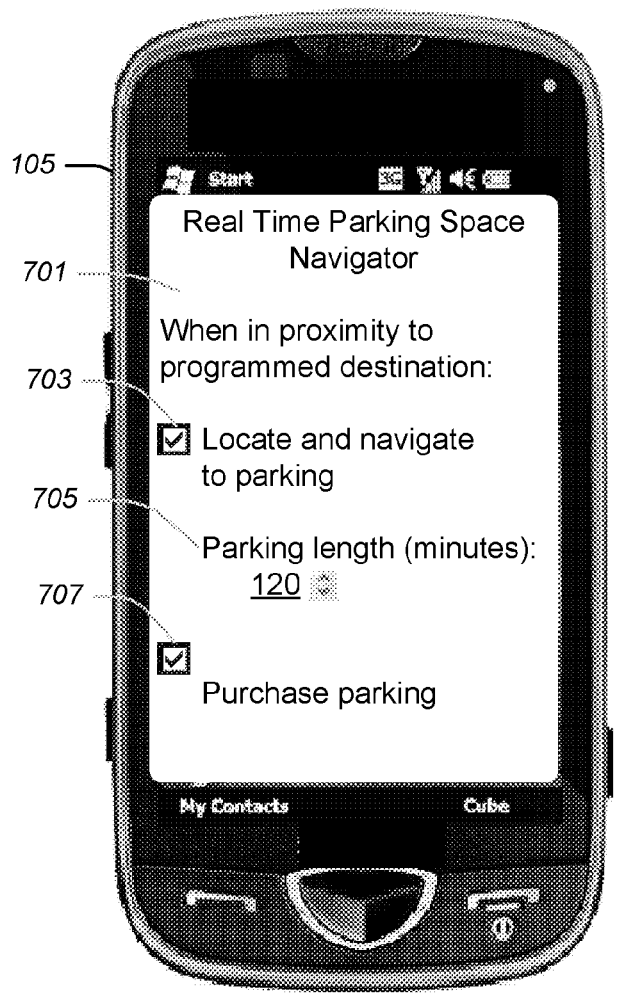
FIG. 7 illustrates an example of a dialog box that obtains parking option selections for a user that can be generated by the real time parking location navigator illustrated in FIGS. 1-3.

FIG. 7 illustrates an example of a dialog box 701 that obtains parking option selections from a user that can be generated by the real time parking location navigator 101 illustrated in FIGS. 1-3. The dialog box 701 may be presented if the user selects the Ask option 505 in FIG. 5 and the Ask option 605 in FIG. 6.

The real time parking location navigator 101 may cause the dialog box 701 to be displayed to a user of the wireless mobile communication device 105. The dialog box 701 asks whether the user wants the navigator to locate and navigate to parking, as reflected by a Locate and navigate to parking check box 703. The dialog box may also ask about the type of parking space that is needed, such as whether it is for a compact automobile, full size automobile, motor home, truck, or motorcycle. The dialog box 701 may also ask how long the user needs to park, as reflected by parking length field 705. This may be a field that is filled in with the number of desired minutes or may provide a selection tool for selecting the desired amount of time. The dialog box 701 may also ask whether the real time parking location navigator 101 should automatically pay for an available parking location, if possible, as reflected by Purchase parking check box 707. As part of this, the type of vehicle may be specified, if this information has not already been provided, such as whether the vehicle is an automobile, motor home, truck, or motorcycle.

The dialog box 701 is indicated in FIG. 4 as being presented after the user specifies a desired destination. The dialog box 701 may instead be presented shortly before the Receive Destination step 401, at the time the vehicle is in proximity to the programmed destination, or at any other time. A user-programmable setting may be provided that controls when the dialog box 701 is displayed.

A determination may be made as to whether the user has specified that the real time parking location navigator 101 should locate available parking locations, as reflected by a Locate Parking? decision step 405. If there is a configuration setting for this (e.g., FIG. 5) or if the user has specified this option at the time of programming the destination (e.g., FIG. 7), the data processing system 303 is configured to check this configuration or specification. If there is no configuration or specification, the data processing system 303 may cause the wireless mobile communication device 105 to ask the user at this time whether an available parking location should be determined and communicated.

If an available parking location is not to be determined and communicated to the user, the data processing system 303 may cause the navigation application 103 to provide navigation information to the destination, as reflected by a Provide Navigation to Destination step 408. On the other hand, if an available parking location is to be determined and communicated, the data processing system 303 causes the navigation system 301 to provide navigation information to the programmed destination, as reflected by a Provide Navigation to Destination step 407. This may be done by using any existing navigation technology. For example, the data processing system 303 may receive information as to the position of the vehicle 107 from the location detection system 111 and provide turn-by-turn instructions based on this position, mapping information, and the programmed destination. The data processing system 303 may itself make the turn-by-turn determinations or they may be made by the navigation computer system 113 and communicated to the data processing system 303, as explained above.

If an available parking location is to be determined, the data processing system 303 determines whether the vehicle is in proximity to the programmed destination, as reflected by a Proximate to Destination? decision step 409.

The data processing system 303 may be configured to determine that the vehicle is in proximity to the programmed destination by detecting that the vehicle has circled an area at slow speeds. This may be detected, for example, by determining that the vehicle has traveled over the same road(s), perhaps in the same direction, within a short time period of time (e.g., a few minutes) at low speed (e.g., less than 20 MPH). Alternatively, this may be detected upon finding that the vehicle has continued to travel within a short distance (e.g., a few blocks) of a particular location (e.g., that programmed into the navigation system). This latter travel may entirely or partially encircle the particular location and may extend for some distance in one or more directions from the particular location. For example, this may be detected when it is determined that the vehicle travels over adjacent parallel streets on at least one of two sides outward from the particular location. Once this is detected, the data processing system 303 may cause the user to be asked whether the user is lost or wants an available parking location and not locate an available parking location unless the user indicates this is desired in response.

The determination of when the vehicle 107 is in proximity to the programmed destination may take into consideration information indicative of how quickly parking spaces at the destination remain available. Information of this type may be requested and obtained from the parking location database 115. If parking spaces historically remain available for a long period of time, the algorithm may determine that the vehicle is in proximity to the programmed destination sooner in time and/or distance. Conversely, if parking spaces historically are taken quickly, the algorithm may delay the time and/or distance at which the vehicle is determined to be in proximity to the programmed destination. The historic speed at which parking spaces are taken may be gauged on any basis, such as based on how quickly available spaces were filled on the same day at the same time during a prior period of weeks or months, during a prior season, or during prior days of the same week. The effect of this historic speed on when the vehicle is considered to be in proximity to the programmed destination may also be on any basis. For example, the vehicle may not be considered to be in proximity until the programmed destination is calculated to be at least within the time that parking spaces are historically taken. So if parking spaces are historically taken within ten minutes, the vehicle would not be considered to be in proximity until the programmed location until it is at least within ten minutes of the programmed destination. A scaling factor may also be applied, such as 50%, meaning that the vehicle would not be considered to be in proximity until the programmed location until it is at least within five minutes of the programmed destination in this example.

If the data processing system 303 determines that the vehicle is not in proximity to the programmed location, the data processing system 303 causes the navigation system 301 to continue to provide navigation information indicative of how to navigate to the programmed destination. Once the data processing system 303 determines that the vehicle is in proximity to the programmed destination, on the other hand, the data processing system 303 queries the parking location database 115 for an available parking location that is near the programmed destination, as reflected by a Locate Parking step 411. The query may be configured to provide information about the programmed destination and may include information about the route that has been determined for the user to reach it.

The parking location database 115 is configured to provide an available parking location in response based on the information provided by the data processing system 303. The location that is provided in response may be one that is near or even closest to the programmed destination. Other factors may be considered in providing a response, such as the cost of the available parking location and/or traffic conditions in the vicinity of the available parking location. For example, an available parking location that is further away may be recommended notwithstanding a closer available parking location if it the closer location would take longer to reach because of traffic conditions or is far more expensive. User-configurable settings may be provided to control these criteria. Parking costs may be obtained from data providers, such as Parking in Motion™.

The data processing system 303 may provide the parking location database 115 with information indicative of how long the vehicle 107 plans to be parked at the available parking location. This may be used by the parking location database 115 to locate an available parking location that is set up to permit this length of stay. Information about the expected length of the parking may be obtained from a query to the user, such as by asking the user to complete the Parking length field 705. Such information may instead be automatically obtained from the user's calendar. For example, a user's calendar may specify that the user must be at a meeting from 2-4 pm on the day the user is traveling. The data processing system 303 may access this information and then tell the parking location database 115 that parking is need for a minimum of two hours, plus a pre-programmed or user-settable additional amount of time (e.g., 15-30 minutes) for walking and other extra-meeting activity. The additional amount of time may be adjusted automatically dependent on the distance of the parking space from the location entered into the real time parking location navigator 101.

More than one available parking location may be returned in response to the query, in which case the data processing system 303 may be configured to present the various options to the user for the section of one of these options. The options may be presented by specifying their locations, the type of space, the cost of the space, their distance from the programmed destination, and/or in any other way. A user-configurable setting may be provided that specifies what information is presented and how this information is presented.

Any type of available parking location may be tracked and provided by the parking location database 115. For example, an available parking location may be a specific parking space, such as a parking space on a public road. An available parking location may in addition or instead be a parking lot.

After receiving an available parking location from the parking location database 115, the data processing system 303 may next check to determine whether the user has specified whether the real time parking location navigator 101 should automatically pay for the available parking location, when such payment can automatically be made, as reflected by a Purchase Parking? decision step 413. During this step, the data processing system 303 may check to see whether the user has configured the real time parking location navigator 101 to always pay for parking locations (e.g., selected the Always option 603), to never pay for available parking locations (e.g., selected the Never option 607), or to pay for the available parking location in connection with just this programmed destination (selected the Ask option 605 and the Purchase parking option 707). The data processing system 303 may in addition or instead ask the user at this time whether such payment should be made. It may do so by causing an appropriate query to be sent to the user through the wireless mobile communication device 105.

If the user has designated that payment for an available parking location should automatically be made, the data processing system 303 is configured to cause that payment to be automatically made, as reflected by a Purchase Parking step 415. During this step, the data processing system 303 causes payment to be automatically made for the available parking location. To facilitate this, the data processing system 303 may provide credit or debit card information, information about the identity of the driver, and/or information about the identity of the vehicle 107, to a payment system that is associated with the available parking location. This information may be provided in advance by the user in configuration settings or saved once entered by the user during an actual use.

Once payment has been made, the data processing system 303 causes the navigation system 301 to provide navigation information indicative of how to navigate from the vehicle's current position to the available parking location, as reflected by a Provide Navigation to Parking step 417. During this step, the navigation system 301 may obtain turn-by-turn information from the navigation computer system 113, with the ultimate destination being changed from the programmed destination to the available parking location.

If parking is not purchased, on the other hand, this creates the possibility that the available parking location may no longer be available by the time the vehicle arrives at it. To help avoid this, the data processing system 303 may still cause the navigation system 301 to provide navigation information indicative of how to navigate to the available parking location, as reflected by a Provide Navigation to Parking step 419. While in route to the available parking location, however, the data processing system 303 is configured to check back with the parking location database 115 to determine whether the available parking location is still available, as reflected by a Parking Location Still Available? decision step 421. If the available parking location is still available, the data processing system 303 continues to cause the navigation system 301 to provide navigation information indicative of how to navigate to the available parking location, as reflected by a Provide Navigation to Parking step 419. This may be implemented in the same way that the Provide Navigation to Parking step 417 is implemented, as discussed above.

As the vehicle continues to approach the available parking location, the data processing system 303 continues to re-query the parking location database 115 to determine if the available parking location is still available, as reflected by the Parking Location Still Available? decision step 421. This may be done periodically, which period may be settable by the user in a configuration setting. The parking location database 115 may instead be configured to provide an alert if a reported parking location is taken. This watching of an available parking location may only happen if the parking location has not been reserved. If it is not, the data processing system 303 is configured to re-query the parking location database 115 for a different available parking location that is also near the programmed destination, as reflected by the Locate Parking step 411. The re-query may be performed in the same way as the original query, as explained above. Upon obtaining the different available parking location, the data processing system 303 is configured to cause the navigation system 301 to provide navigation information indicative of how to navigate to the different available parking location, as reflected by the Provide Navigation to Parking step 419.

The process of querying and re-querying the parking location database 115 and redirecting the navigation information to the most currently available parking location may repeat as the vehicle 107 approaches the available parking location. The checking of the continued availability of the available parking location may be done on a periodic basis, based on the progress the vehicle makes, and/or on any other basis.

Figure 8:
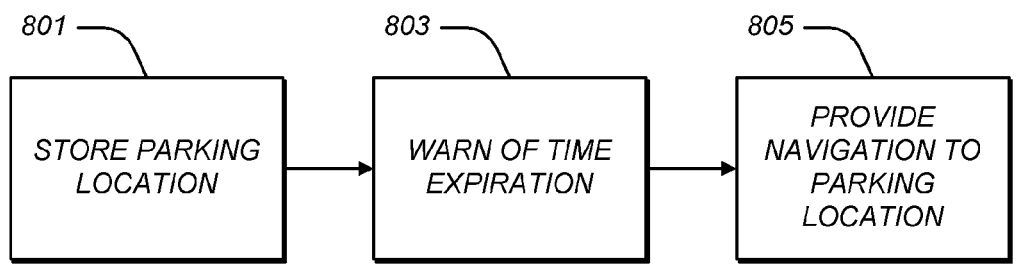
FIG. 8 illustrates an example of a process that the real time parking location navigator illustrated in FIGS. 1-3 can implement to monitor the time that remains for use of a parking location and to provide navigation to that parking location.

FIG. 8 illustrates an example of a process that the real time parking location navigator 101 illustrated in FIGS. 1-3 can implement to monitor the time that remains for use of a parking location and to provide navigation to that parking location. Once the vehicle is parked, the data processing system 303 may cause the location at which the vehicle is parked to be stored, as reflected by a Store Parking Location step 801. Any technology may be used to trigger this storage. For example, the user may actuate a user control on the wireless mobile communication device 105 indicating that the vehicle has been parked and that its location is to be stored. In addition or instead, the data processing system 303 may be configured to automatically detect that the vehicle is parked. For example, the data processing system 303 may detect that the vehicle has arrived at the available parking location using information provided by the location detection system 111. The data processing system 303 may in addition or instead detect an absence of movement of the vehicle for a pre-determined period and/or detect that the engine of the vehicle has been turned off.

The data processing system 303 may then start an internal timer and may compare the time on this timer with any restrictions on the length of time a vehicle may be parked at the available parking location. These restrictions, for example, may be supplied by the parking location database 115, either at the time the available parking location is provided and/or pursuant to a subsequent query. The restrictions may in addition or instead be based on a time provided by a parking meter, which time may be communicated to the data processing system 303 electronically from the parking meter and/or by a user that manually enters the information in the wireless mobile communication device 105.

At a pre-determined period prior to the expiration of the allowed time, which pre-determined period may be user-settable, such as 20 minutes, the data processing system 303 may be configured to cause the wireless mobile communication device 105 to issue a warning to the user of the pending expiration of the allotted parking time, as reflected by a Warn of Time Expiration step 803. This pre-determined period may be automatically adjusted based on the type of parking space and/or its proximity to the programmed destination. The data processing system 303 may be configured to cause the wireless mobile communication device 105 to provide navigation information indicative of how to navigate to the available parking location, as indicated by a Provide Navigation to Parking Location step 805. This step may be implemented in the same way as the user was directed to the available parking location while in the vehicle 107, as explained above.

Unless otherwise indicated, the navigation application 103, the real time parking location navigator 101, the navigation computer system 113, and the parking location database 115 that have been discussed herein are implemented with a computer system configured to perform the functions that have been described herein for the component. Each computer system includes one or more processors, memory devices (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

Each computer system for the navigation computer system 113 and the parking location database 115 may include one or more computers at the same or different locations. When at different locations, the computers may be configured to communicate with one another through a wired and/or wireless network communication system.

Each computer system may include software (e.g., one or more operating systems, device drivers, application programs, and/or communication programs). When software is included, the software includes programming instructions and may include associated data and libraries. When included, the programming instructions are configured to implement one or more algorithms that implement one more of the functions of the computer system, as recited herein. Each function that is performed by an algorithm also constitutes a description of the algorithm. The software may be stored on one or more non-transitory, tangible storage devices, such as one or more hard disk drives, CDs, DVDs, and/or flash memories. The software may be in source code and/or object code format. Associated data may be stored in any type of volatile and/or non-volatile memory.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases in a claim mean that the claim is not intended to and should not be interpreted to be limited to any of the corresponding structures, materials, or acts or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

The invention claimed is:

1. A real time parking location navigator comprising:
   a navigation system configured to provide navigation information indicative of how to navigate a vehicle to:
      a programmed destination; and
      an available parking location that is near but different from the programmed destination;
   a data processing system configured to:
      receive the programmed destination;
      cause the navigation system to provide the navigation information to the programmed destination;
      determine when a current location of the vehicle is in proximity to the programmed destination;
      in response to determining that the current location of the vehicle is in the proximity to the programmed destination:
         query a parking location database containing information indicative of available parking locations near the programmed destination;
         identify the available parking location from among the available parking locations in the parking location database responsive to the query; and
         in response to identifying the available parking location, cause the navigation system to provide further navigation information including turn-by-turn information indicative of how to navigate from the current location of the vehicle to the identified available parking location.

2. The real time parking location navigator of claim 1 wherein the data processing system is configured to offer a user-settable parking option governing whether the data processing system queries and provides the navigation information about an available parking location.

3. The real time parking location navigator of claim 2 wherein the data processing system is configured to offer a user-setting that makes a parking option setting applicable to all programmed destinations.

4. The real time parking location navigator of claim 2 wherein the data processing system is configured to offer the parking option at or about a time when the programmed destination is programmed.

5. The real time parking location navigator of claim 2 wherein the data processing system is configured to offer the parking option at or about a time when the vehicle is first detected to be in proximity to the programmed destination.

6. The real time parking location navigator of claim 1 wherein the data processing system is configured to:

calculate an estimated arrival time at the programmed destination; and determine when the vehicle is in proximity to the programmed destination based on the estimated arrival time.

7. The real time parking location navigator of claim 1 wherein the data processing system is configured to:
calculate a remaining travel distance the vehicle is to travel to reach the programmed destination; and
determine when the vehicle is in proximity to the programmed destination based on the remaining travel distance.

8. The real time parking location navigator of claim 1 wherein the data processing system is configured to determine when the vehicle is in proximity to the programmed destination based on data in the parking location database indicative of how quickly parking spaces at the available parking location remain available.

9. The real time parking location navigator of claim 1 wherein the data processing system is configured to determine that the vehicle is in proximity to the programmed destination by detecting that the vehicle has circled an area at slow speeds.

10. The real time parking location navigator of claim 1 wherein the available parking location is a location of a parking lot.

11. The real time parking location navigator of claim 1 wherein the available parking location is a location of a specific parking space.

12. The real time parking location navigator of claim 1 wherein the data processing system is configured to offer a person a purchase option to purchase a parking space at the available parking location.

13. The real time parking location navigator of claim 12 wherein the data processing system is configured to offer a user setting that makes the purchase option setting applicable to all programmed destinations.

14. The real time parking location navigator of claim 12 wherein the data processing system is configured to offer the purchase option at a time the programmed destination is programmed.

15. The real time parking location navigator of claim 12 wherein the data processing system is configured to offer the purchase option at a time the vehicle is determined to be in close proximity to the programmed destination.

16. The real time parking location navigator of claim 1 wherein the data processing system is configured to re-query the parking location database after identifying the available location from the parking location database to determine if the identified available parking location is still available and, if not:
to re-query the parking location database for a different available parking location that is near the programmed destination; and
cause the navigation system to provide navigation information indicative of how to navigate to the different available parking location.

17. The real time parking location navigator of claim 1 wherein the data processing system is configured to:
receive information indicative of how long the vehicle desires an available parking space; and
select the available parking location that is indicated by information in the parking location database as being available for as long as the available parking space is desired by the vehicle.

18. The real time parking location navigator of claim 1 wherein the data processing system is configured to:

receive information indicative of how long the available parking location is available; and
after the vehicle has begun to use the available parking location but before the available parking location is no longer available, issue a warning to a user of the real time parking location navigator of the approaching unavailability of the available parking location.

19. The real time parking location navigator of claim 18 wherein the data processing system is configured to issue the warning without the user having to manually set a timer.

20. The real time parking location navigator of claim 1 wherein the data processing system is configured to store a location at which the vehicle is parked and, upon request, cause the navigation system to provide navigation information to a user about how to navigate to the parked vehicle.

21. The real time parking location navigator of claim 1 wherein the real time parking location navigator is part of a wireless mobile communication device.

22. The real time parking location navigator of claim 1 wherein the real time parking location navigator is located within the vehicle.

23. Non-transitory, tangible, computer-readable media containing a program of instructions that cause a computer system running the program to:
receive a programmed destination for a vehicle;
provide navigation information indicative of how to navigate to the programmed destination;
determine when a current location of the vehicle is in proximity to the programmed destination;
in response to determining that the current location of the vehicle is in the proximity to the programmed destination:
query a parking location database containing information indicative of available parking locations near but different from the programmed destination;
identify the available parking location from among the available parking locations in the parking location database responsive to the query; and
provide further navigation information including turn-by-turn information indicative of how to navigate from the current location of the vehicle to the identified available parking location.

24. A real time parking location navigator comprising:
a navigation system configured to provide navigation information indicative of how to navigate a vehicle to:
a programmed destination; and
an available parking location that is near but different from the programmed destination;
a data processing system configured to:
receive the programmed destination;
cause the navigation system to provide the navigation information to the programmed destination;
determine when the vehicle is in proximity to the programmed destination;
in response to determining that the vehicle is in the proximity to the programmed destination:
query a parking location database containing information indicative of available parking locations for an available parking location that is near the programmed destination;
receive the available parking location from the parking location database; and
cause the navigation system to provide navigation information indicative of how to navigate to the available parking location,
wherein the data processing system is configured to at least one of:

a) offer a user-settable parking option governing whether the data processing system queries and provides the navigation information about an available parking location,
b) determine when the vehicle is in proximity to the programmed destination based on data in the parking location database indicative of how quickly parking spaces at the available parking location remain available, or
c) receive information indicative of how long the vehicle desires an available parking space, and select the available parking location that is indicated by information in the parking location database as being available for as long as the available parking space is desired by the vehicle.

* * * * *